United States Patent [19]
Harrison

[11] Patent Number: 5,720,518
[45] Date of Patent: Feb. 24, 1998

[54] UNIVERSAL BIKE AND EXERCYCLE SEAT CUSHION ACCESSORY

[76] Inventor: Craig R. Harrison, 180 N. Main, St. George, Utah 84770

[21] Appl. No.: 705,959

[22] Filed: Aug. 30, 1996

[51] Int. Cl.[6] ............................................. B62J 1/18
[52] U.S. Cl. .................... 297/214; 297/202; 297/452.27
[58] Field of Search ........................ 297/214, 195.1, 297/452.27, 228.12, 202; 5/653, 654, 727, 740

[56] References Cited

U.S. PATENT DOCUMENTS

| | | |
|---|---|---|
| 3,237,319 | 3/1966 | Hansen . |
| 3,402,411 | 9/1968 | Hansen . |
| 3,635,849 | 1/1972 | Hansen . |
| 3,807,793 | 4/1974 | Jacobs . |
| 3,833,259 | 9/1974 | Pershing ............................. 297/452.27 |
| 3,844,611 | 10/1974 | Young . |
| 3,997,214 | 12/1976 | Jacobs . |
| 4,012,072 | 3/1977 | Hansen ..................................... 297/214 |
| 4,038,762 | 8/1977 | Swan, Jr. . |
| 4,083,127 | 4/1978 | Hansen . |
| 4,108,928 | 8/1978 | Swan, Jr. . |
| 4,144,658 | 3/1979 | Swan, Jr. . |
| 4,229,546 | 10/1980 | Swan, Jr. . |
| 4,243,754 | 1/1981 | Swan, Jr. . |
| 4,319,781 | 3/1982 | Tsuge ...................................... 297/214 |
| 4,429,915 | 2/1984 | Flager . |
| 4,504,089 | 3/1985 | Calvert et al. . |
| 4,733,907 | 3/1988 | Fellenbaum . |
| 4,815,361 | 3/1989 | Chiaella ................................... 297/214 |
| 5,147,685 | 9/1992 | Hansen . |
| 5,330,249 | 7/1994 | Weber et al. .......................... 297/214 |
| 5,348,369 | 9/1994 | Yu ....................................... 297/195.1 |
| 5,509,718 | 4/1996 | Neary .................................. 297/228.12 |

Primary Examiner—Peter R. Brown
Assistant Examiner—Anthony D. Barfield
Attorney, Agent, or Firm—K. S. Cornaby

[57] ABSTRACT

A universal bike seat and exercycle seat cushion that is placed on top of conventional bike seats, having two separate matching cushioning devices whose surface area is smaller than the conventional bike seat upon which they are placed allowing unlimited placement adjustment options for the rider. The cushioning devices have multiple stages of cushioning materials including low density open cell foam, high density open cell foam and low density closed cell foam, and are semi-oval in shape, which creates a no-contact, 'pressure-free' zone for the rider's tail bone, soft tissues and genitalia. The device may be secured to the bike seat by appropriate means, such as a slip cover.

1 Claim, 3 Drawing Sheets

5,720,518

UNIVERSAL BIKE AND EXERCYCLE SEAT CUSHION ACCESSORY

FIELD OF INVENTION

This invention relates to the field of padding devices for seats for both moving and stationary bikes and exercycles.

BACKGROUND—DESCRIPTION OF PRIOR ART

The bike seat pain dilemma has resulted in the creation of many different seat and saddle configurations. The specific challenges facing the pain issue are:

a) The comfort of the two principle contact points of the pelvis referred to as the 'seat bones'.
b) Pressure on the soft tissue areas of the groin.
c) Numbness in the genitalia.
d) Pressure and rubbing in the rectal and tail bone area.
e) Chafing due to rubbing and excessive surface area contact.
f) Shock absorption.

As in some medical practices, the cure creates as many challenges as the disease. For bikers, each seat design and accessory design comes with its own set of problems. As the early evolution of the bike saddle demonstrated it did not take long to realize that a plank of wood, which was first used when cycles were invented, just would not do. More recently, seat cushion 'accessories' were added to the list of attempted solutions. With them, however, came a whole new set of challenges, such as:

a) Size of the saddle.
b) Unwanted weight added to the bike.
c) Undesirable migration of the cushioning materials used in the seat accessory.
d) Consistent performance in weather and temperature extremes.
e) One size fits all vs. an adjustable custom fit.
f) Unique vs. conventional saddle configurations.
g) Durability of cushioning materials.
h) Cost.

U.S. Pat. No. 3,237,319 issued to Alden Hansen on Mar. 1, 1966, introduces an accessory using flowable gels in a bladder as a cushioning device. Other patents issued to Alden Hansen on this concept include: U.S. Pat. Nos. 3,402,411 issued Sep. 24, 1968 and 3,635,849 issued Jan. 18, 1972. Also U.S. Pat. No. 4,038,762 by Swan Jr., issued Aug. 2, 1977; U.S. Pat. No. 4,083,127 by Chris Hansen, issued Apr. 11, 1978; U.S. Pat. No. 4,108,928 issued Aug. 22, 1978; U.S. Pat. No. 4,144,658 by Swan Jr. issued Mar. 20, 1979; U.S. Pat. No. 4,229,546 by Swan Jr. issued Sep. 21, 1980; U.S. Pat. No. 4,243,754 by Swan Jr., issued Jan. 6, 1981.

Despite these efforts, problems still exist in solving the comfort challenge. These challenges include the lack of stability for the rider in weather and temperature extremes. The full seat gel bladders become gooey and soft when very warm and in the cold, become a cold solid mass. Full seat gels are intrinsically heavy and can add undesirable weight. Other problems with the full seat gel bladders are: rubbing, internal pressure variables, thickness, viscosity and puncturability.

Subsequent designs such as U.S. Pat. No. 4,504,089 by Calvert et al., issued Mar. 12, 1985; U.S. Pat No. 3,807,793 by Jacobs issued Apr. 30, 1974; U.S. Pat. No. 3,997,214 by Jacobs issued Dec. 14, 1976, demonstrates variations where the gel or other flowable materials are used in an accessory having compartments. The materials are allowed to flow directionally within those compartments. One medium suggested was water. Although addressing some of the migration problems, these do not provide for a more satisfactory approach to most of the afore mentioned problems.

U.S. Pat. No. 3,844,611 by Young, issued Oct. 29, 1974, represents a combination of low and high density foams in a full saddle configuration. Ten years later U.S. Pat. No. 4,429,915 by Flager, issued Feb. 7, 1984, introduced an adjustable full seat design allowing for foam inserts of varying sizes, shapes and densities. At the rear of the saddle, an air valve allows for the input of pressurized air. This was to adjust the firmness of the perimeter of the seat.

U.S. Pat. No. 4,733,907 by Fellenbaum, issued Mar. 29, 1988 introduced a similar design but in an accessory format. It contained a seat cushion and cover combined into one unit. It is composed of a foam interior and vinyl cover having a rear bag component. While both designs are lighter in weight than other accessories having a full seat configurations made of gel, the overall size of each unit is fixed. They are incapable of adjusting to the size of the rider. Regardless of whether the rider is extra petite or extra wide, they are expected to achieve the same comfort level on the same sized seat accessory. This fixed aspect becomes very apparent when considering the needs of the exercyclist.

In U.S. Pat. No. 5,147,685 by Chris Hanson issued Feb. 19, 1988, demonstrates the positive relationship between open-cell pre-set foams, closed-cell foams and flowable materials. Once again, however, this accessory is a 'set' size and one size is expected to fit all derrieres. Also, all stated designs are of a full-seat configuration exposing the entire surface area of the seat to the rider. Although acknowledging the problem of pressure and rubbing, all afore mentioned designs retained enough material in the front extended area of the seat to cause the rider discomfort. Durability must also be a consideration in how well a seat design performs. All products have a rate of attrition but if the exposed bladder of any of these gel designs are punctured once, the gel or air or water flows out and the usefulness of the unit is lost.

OBJECTS AND ADVANTAGES

Accordingly, several objects and advantages of my present invention are:

a) to provide a bike seat accessory that is universal in nature and can be used effectively on any bike or exercycle seat configuration;

b) to provide a bike seat accessory that has two separate and adjustable cushioning devices which can be arranged on a seat creating a custom fit for each individual rider;

c) to provide a bike seat accessory that has multiple stages of both open cell and closed cell foams with the possible use of flowable materials;

d) to provide a bike seat accessory that performs consistently in hot as well as cold weather conditions;

e) to provide a bike seat accessory that is so comfortable that it allows the rider an extended riding time thus increasing the personal benefits of cycling;

f) to provide a bike seat accessory that reduces friction by reducing the amount of surface area making contact with the riders derriere;

g) to provide a bike seat accessory that has a 'cut-away' design while lifting the rider up off the seat creating an open area for the sensitive parts of the derriere to enjoy the benefits of air circulation and reduced pressure;

h) to provide a bike seat accessory which has an attractive, aerodynamic, air permeable, and low friction surface slip cover that fits over both the seat as well as the cushion accessory.

Further objects and advantages are to provide a bike seat accessory that can be used easily and conveniently to create a comfortable seat out of any make or model without all the painful side effects of most conventional saddles or problems that accompany gel accessories and can be used on a bike without adding cumbersome weight, which can adjust to any riders physical dimensions, which provides superior 'multi-stage' shock absorption in all weather conditions while reducing areas of pressure and chafing in a riders sensitive tissue areas. Still, further objects and advantages will become apparent from a consideration of the ensuing description and drawings.

Thus the reader can see that the two piece, 'multi-stage' adjustable seat cushion accessory and slip cover provides a highly reliable, light weight and economical device that can be used by persons of almost any age, size or gender.

While my above description contains many specificities, these should not be construed as limitations on the scope of the invention, but rather as an exemplification of one preferred embodiment thereof. For example, a mountain bike saddle is smaller than and exercycle saddle because of the body angle of the rider, the structural design and the intended use of the cycling apparatus. While maintaining the basic design and advantages of the previously described semi-oval bike seat accessory, the overall size and thickness of the stages of the cushioning materials will vary according to the size and intended use of the cycle and rider. Accordingly, the scope of the invention should be determined not by the embodiments illustrated, but by the appended claims and their legal equivalents.

DRAWING FIGURES

Figure 1:
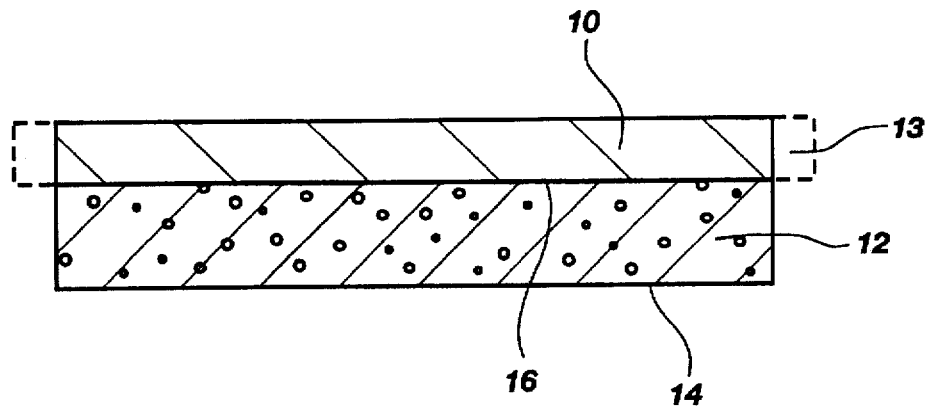
FIG. 1 illustrates a cross sectional view of one cushion in FIG. 6 in accordance with one embodiment on this invention.

Reference Numerals in Drawings 10 open cell low compression set foam top layer 12 closed cell foam or encapsulated flowable material 13 extended overhang of top layer 14 pressure sensitive repositionable adhesive applied to the exposed bottom surface 16 permanent bonding agent applied between layers 18 high density open cell foam layer 20 space provided between the two cushions 22 air permeable slip cover

DETAILED DESCRIPTION OF THE PREFERRED EMBODIMENTS OF THE INVENTION

Figure 3:
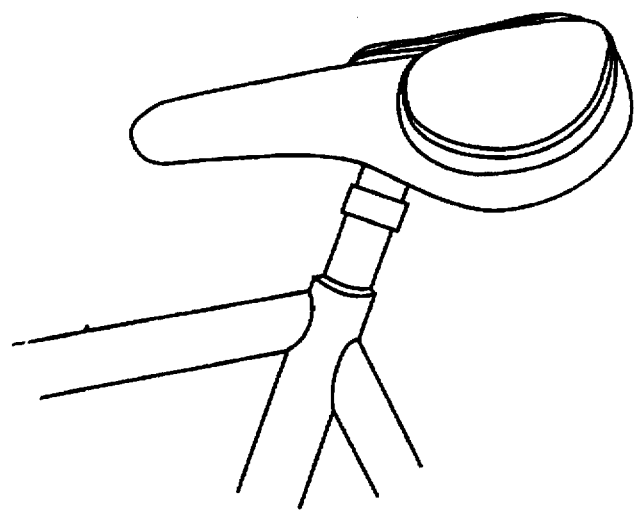
FIG. 3 illustrates a dimensional view of the invention as it would appear when placed on a mountain bike saddle without the slip cover.
Figure 4:
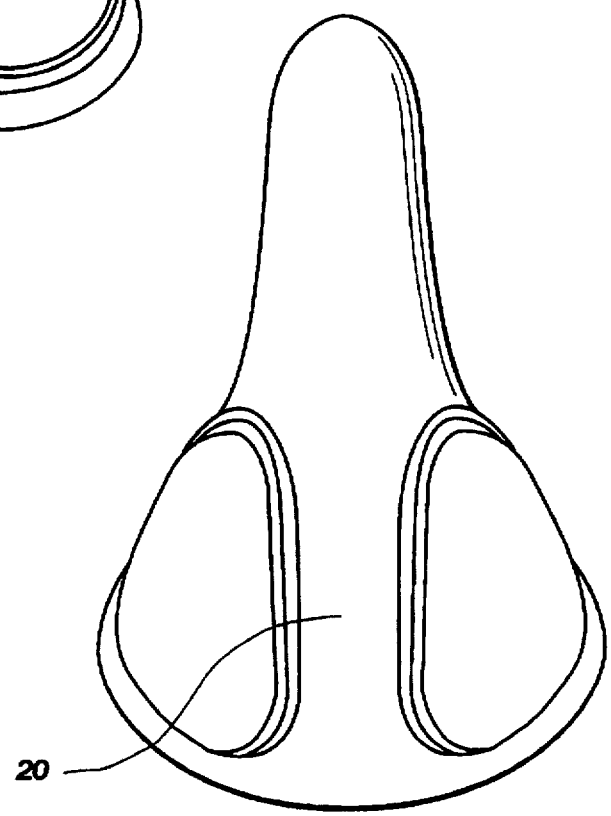
FIG. 4 illustrates a top view of FIG. 3 without the slip cover.
Figure 6:
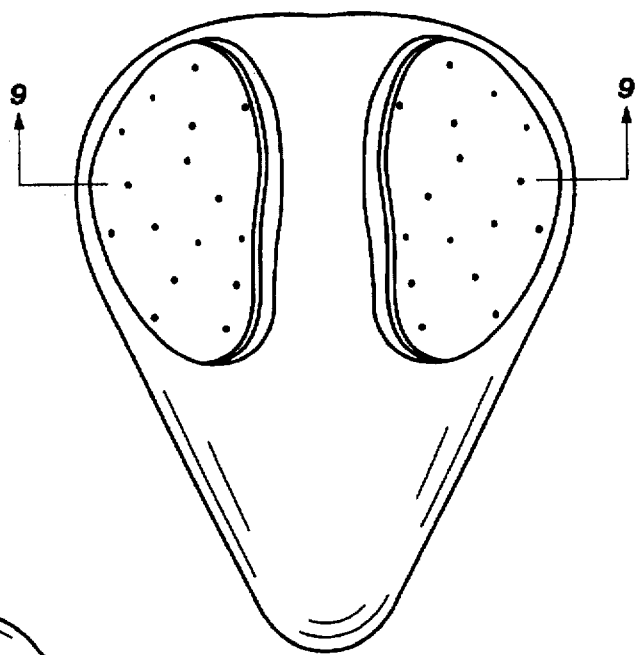
FIG. 6 illustrates a top view as it would appear on a recreation saddle or medium sized seat in accordance with another embodiment of this invention also shown without the slip cover.
Figure 7:
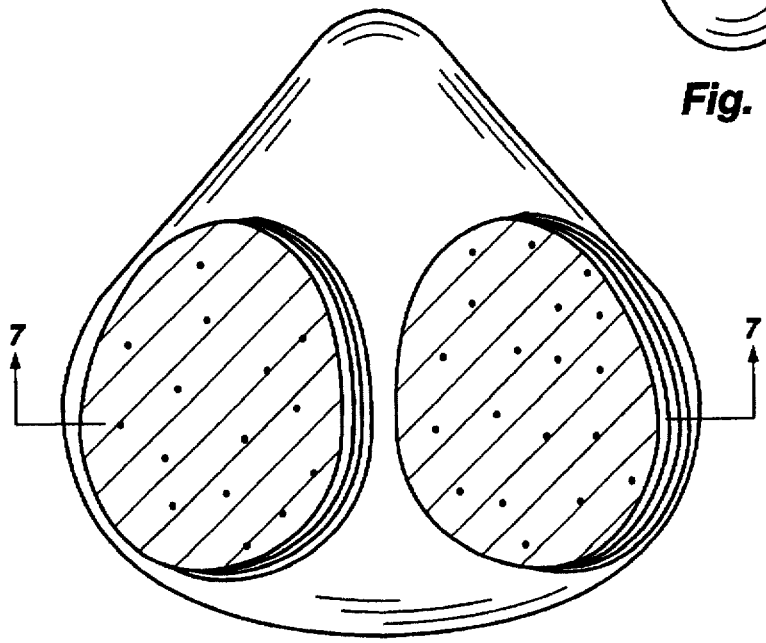
FIG. 7 illustrates a top view on an exercycle seat in accordance with the embodiment of this invention as illustrated in FIG. 2 without the slip cover.
Figure 8:
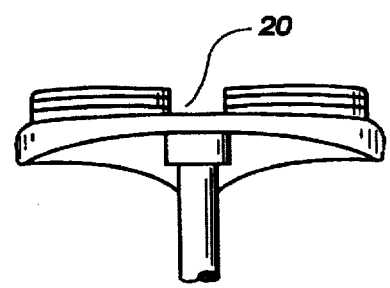
FIG. 8 is a rear elevational view of the seat cushions illustrated in FIG. 3.

The typical embodiments of the present invention is illustrated in FIG. 6 and FIG. 7 (top view) and FIG. 3 (dimensional view). Each set of seat cushions have two separate pieces which are placed on top of any mountain bike FIG. 4 recreation bike FIG. 6 or exercycle seat FIG. 7. Since all derrieres differ slightly, these cushions accomplish a number of things; exact positioning for a custom fit providing superior shock absorption, exact spacing for both the tailbone and rectal areas, as well as the other soft tissue areas FIG. 20. Being two pieces and 'cut-away', the cushions do not extent out over the full length of the seat itself. The cushions actually hold the rider up off the seat and provides an open area for air circulation and reduced contact for the sensitive gentile tissues of both male and female riders.

Figure 2:
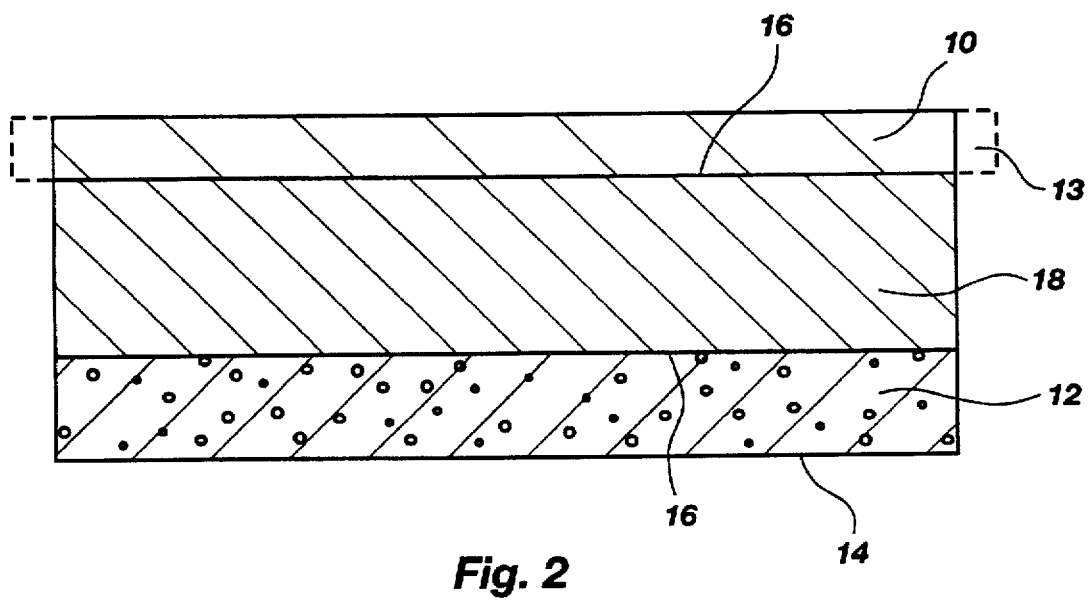
FIG. 2 illustrates a cross sectional view of one cushion in FIG. 7 in accordance with another embodiment of this invention that is similar to FIG. 1 but having an extra layer of cushioning material.

Superior shock absorption in the preferred embodiment of this invention is accomplished through staging of various types and densities of foams and/or flowable materials as illustrated in FIG. 1 and FIG. 2. Because the touring bikes and mountain bikes are set up for higher performance, the rider is positioned in a forward leaning mode. To accommodate this mode, saddles are smaller. Therefore, the preferred embodiment of this invention for a mountain bike has a lower profile and is smaller in circumference FIG. 1. The combined total height varies between 0.5 inches to 1.25 inches consisting of a bottom of low poundage closed cell foam such as ethylene vinyl acetate (12) and an upper, thinner layer of open cell low compression set foam such as polyethylene (10). The layers are held together with a permanent bonding agent such as a mixture of petroleum naphtha hexane, toluene and acetone (16). The bottom surface (14) has a layer of pressure sensitive, reattachable adhesive that keeps the cushions from slipping on the seat surface while peddling. This type of adhesive releases and re-sticks when a position change is required. The top layer of foam is extended over the edge of the layers beneath (13) to create a nice rounded and finished appearance when the slip cover (22) is pulled into place.

The properties of each stage of cushioning material is important. They work together much like multiple stage springs in an automobile suspension. The top (10) open cell low compression foam eases the rider onto the next stage which has a slightly higher density. In the case of the mountain bike FIG. 1, the closed cell foam could be the only next layer (12). The closed cell foam reacts much differently than open cell foams to narrow points of compression that are exerted with the 'seat bones' of a rider. Ranging in pound density from 1.5 to 3, the closed cell foam is soft enough to feel comfortable, but upon impact, defuses or deflects the blow. Open cell foams 'bottom out' easily, where it is difficult to get a closed cell foam to 'bottom out'. The open cell foam is more comfortable to the touch and gives more sitting comfort to the rider. So together they provide both comfort and shock absorption. Also within the embodiment of the invention, an encapsulated flowable substance could also be used as the base layer or bottom stage (12).

In the case of an exercyclist, the positioning of the body is more erect. Therefore, the angle of the impact to the 'seat bones' is more direct. This requires in a cushion device increased multiple staging FIG. 2. Between the top layer of the open cell foam and the base layer of closed cell foam, is added a large layer of high density polyethylene open cell foam with a thickness ranging between 0.5 inches to 1.5 inches. These multiple stage open cell layers and the closed cell bottom layer provides real comfort while sitting erect.

Figure 5:
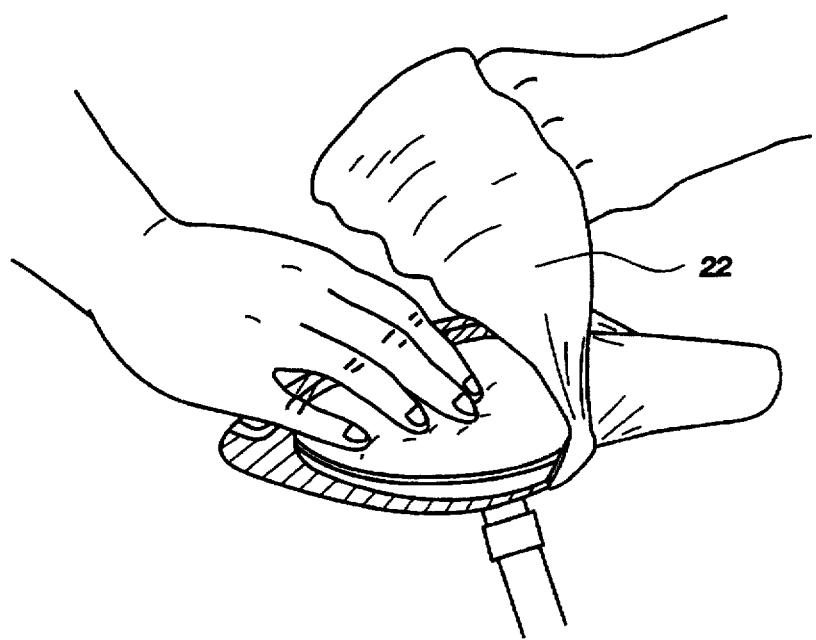
FIG. 5 illustrates the process of installing the slip cover over the seat and cushioning device as well as its functional relationship to both.

To give the seat accessory a durable, aerodynamic and low friction surface, an air permeable stretching nylon slip cover with an elastic trim (22) is pulled over both the seat and cushions FIG. 5.

With the variety of embodiments illustrated, the possibilities for providing painless biking and exercycling are almost unlimited. The number of bikes not being used because of painful saddles is staggering. To provide an effective way to address the pain problem is, in the works of a woman who tested the exercycle seat accessory, "This is a godsend". That certainly is overstating it, but to have a system that fits any seat size or shape, adjusts to any sized derriere and really works, is significant.

SUMMARY RAMIFICATIONS AND SCOPE

Accordingly, the reader will see that the adjustable cushion bike seat accessory represents a convergence of independent ideas. A cyclist can achieve a comfortable seat without having to purchase and experiment with different saddle configurations. Regardless of his current saddle style, this accessory can improve its comfort.

it permits a rider to achieve a comfortable seat without having to discard his current saddle and purchase another expensive full-saddle apparatus.

it permits any rider to adjust the cushions to fit their personal comfort needs regardless of their size, shape or gender.

it provides a real and measurable space between the usually painful areas of the riders derriere and the surface of the bike seat that usually inflicts the most pain.

it provides perhaps for the first time, a truly comfortable ride for exercyclists.

it provides easy installation on any conventional bike seat configuration.

it provides a measurable reduction in surface area making contact with the rider allowing a freedom of motion unattainable with conventional, full seat designs.

Although the description above contains many specificities, these should not be construed as limiting the scope of the invention but as merely providing illustrations of some of the presently preferred embodiments of this invention. For example, the cushions may vary slightly in shape, such as circular, oval, semi-oval, etc., the cushion layers may vary in thickness, such as the mountain bike may have a total thickness of 0.5 inches, 0.625 inches or 0.75 inches, and the exercycle accessory may vary from 0.75 inches to 2 inches and so forth. Thus the scope of the invention should be determined by the appended claims and their legal equivalents rather than by examples given.

I claim:

1. A secondary bike seat cushion comprising:

a set of at least two separate matching cushions non-permanently attached to an upper side of a bicycle seat;

said cushions are formed from multiple sections of cushioning materials for dampening vibration and shock absorption; said cushions include a bottom layer of low poundage closed cell ethylene vinyl acetate, a middle layer of high density pre-set open cell foam and a top layer of low density pre-set open cell foam;

said cushions being semi-oval in shape to provide adequate surface area for placement of the user's ischial bones, thus allowing an indefinite number of adjustment possibilities; and a protective cover in direct sliding contact with the cushions.

* * * * *